March 31, 1936.  W. C. ROBBINS  2,035,618
SHOCK ABSORBER
Filed Oct. 6, 1934  3 Sheets-Sheet 1
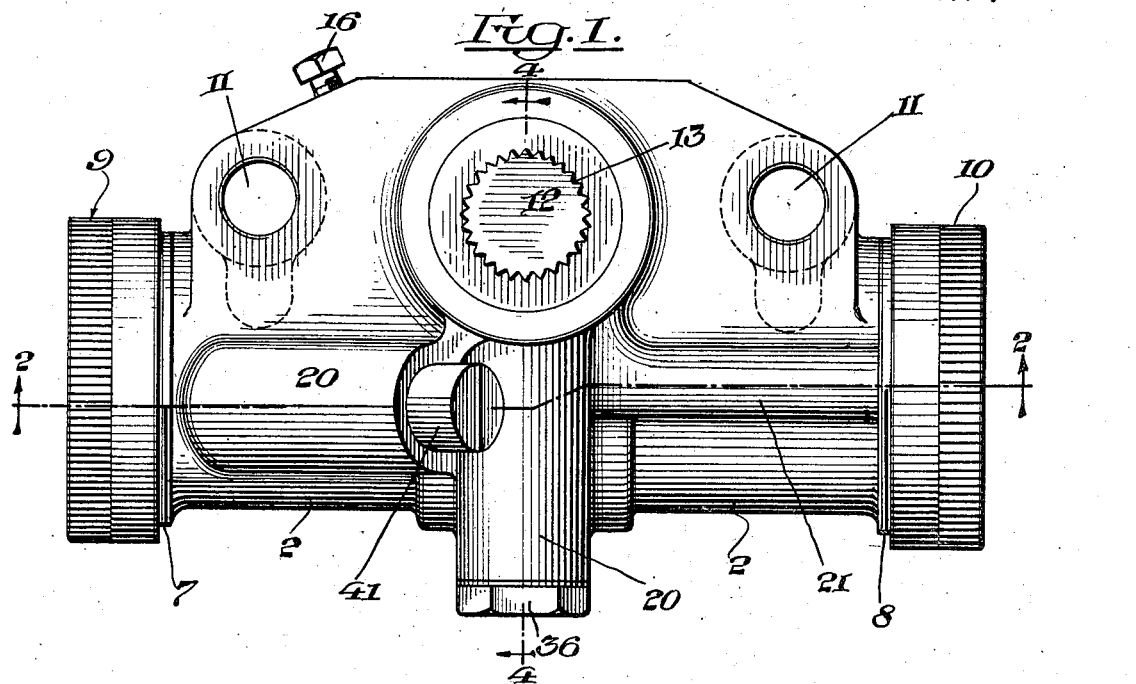
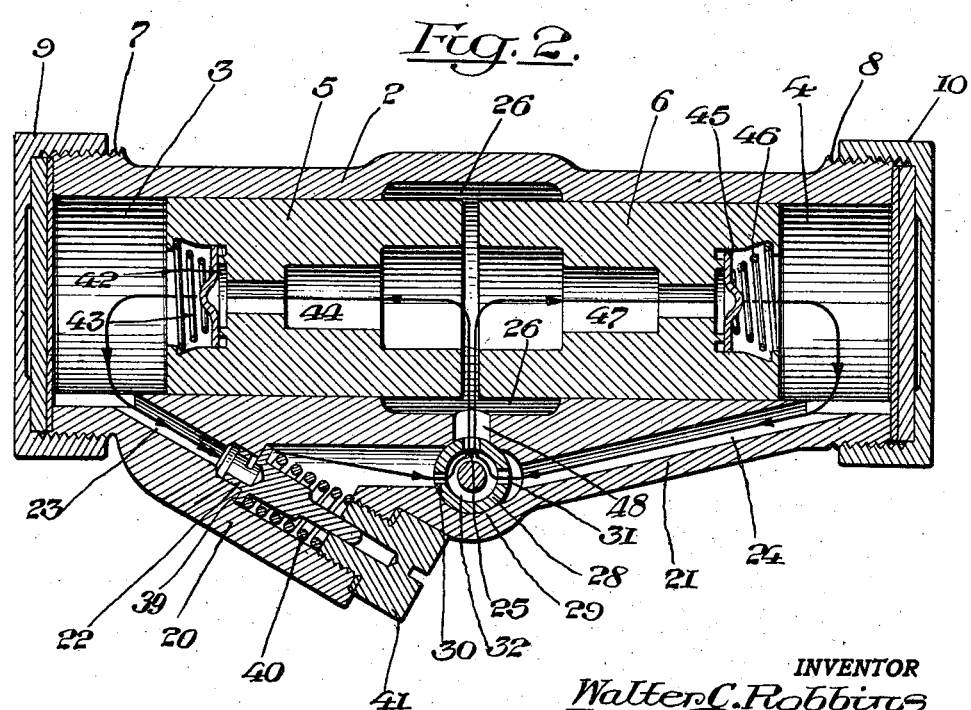
INVENTOR
Walter C. Robbins
BY
ATTORNEY March 31, 1936.  W. C. ROBBINS  2,035,618

SHOCK ABSORBER

Filed Oct. 6, 1934  3 Sheets-Sheet 2

INVENTOR
Walter C. Robbins
BY
ATTORNEY

March 31, 1936.  W. C. ROBBINS  2,035,618
SHOCK ABSORBER
Filed Oct. 6, 1934   3 Sheets-Sheet 3
Fig. 5.
Popoff Valve
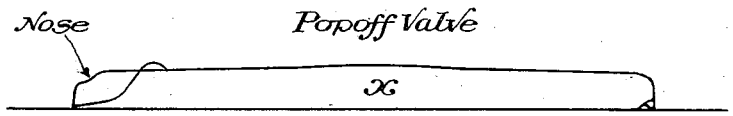
Fig. 6.
Fixed Orifice Valve
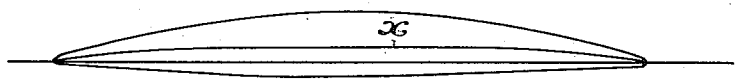
Fig. 7.
New Valve Combination
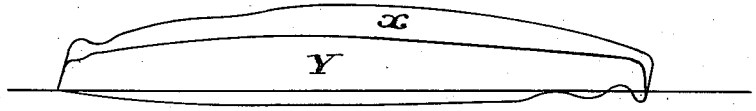
INVENTOR
Walter C. Robbins
BY
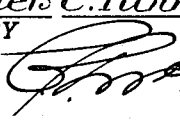
ATTORNEY Patented Mar. 31, 1936

2,035,618

UNITED STATES PATENT OFFICE 2,035,618

SHOCK ABSORBER

Walter C. Robbins, Cleveland, Ohio, assignor to The National Acme Company, Cleveland, Ohio, a corporation of Ohio Application October 6, 1934, Serial No. 747,140

20 Claims. (Cl. 188—88)

The present improvement relates to vehicle shock absorbers, and more particularly to shock absorbers of the fluid type in which the necessary damping resistance is created by opposing a resistant fluid flow to the movement of the piston or the like.

In the instruments of this type it is customary to provide the necessary resistance to fluid flow by causing the fluid, generally in the nature of a viscous liquid, to pass through a restricted passage or orifice and govern or measure the resistance thus created by controlling the size of the orifice either with a manually adjustable valve, such as a "fixed orifice valve" or a spring loaded relief valve such as a poppet or "popoff valve".

It is recognized in instruments of this type that the restriction imposed upon the fluid flow shall be predetermined and of such a character that the operation of the shock absorber is predictable and to this end thermostatically controlled means have been inserted in the relief valves to compensate for the change in viscosity of the fluid due to temperature changes.

The control of the fluid flow by either type of valve has certain advantages as well as disadvantages and the principal object of the present invention is to utilize the advantageous features of the two types of control valves in one device while doing away with the disadvantages thereof, thus providing a shock absorber of the fluid type which presents an accurate and predictable resistance to the piston movement regardless of the viscosity of the cushioning liquid as determined by temperature conditions.

The present invention is an improvement on that shown and described in my pending application Serial No. 581,408, filed December 16, 1931.

In the drawings accompanying and forming a part of this specification Fig. 1 is an exterior view of this improved shock absorber;

Fig. 2 is a sectional view taken on line 2—2 of Fig. 1, the arrows indicating the flow of liquid through the shock absorber;

Fig. 5 illustrates a graphical curve obtained with the use of a shock absorber having a "popoff type valve";

Fig. 6 illustrates a graphical curve obtained with the use of a shock absorber having a "fixed orifice type valve"; and Fig. 7 illustrates a graphical curve obtained with the use of a shock absorber having the valve arrangement of the present improvement.

Similar characters of reference indicate corresponding parts in the several views.

Figure 3:
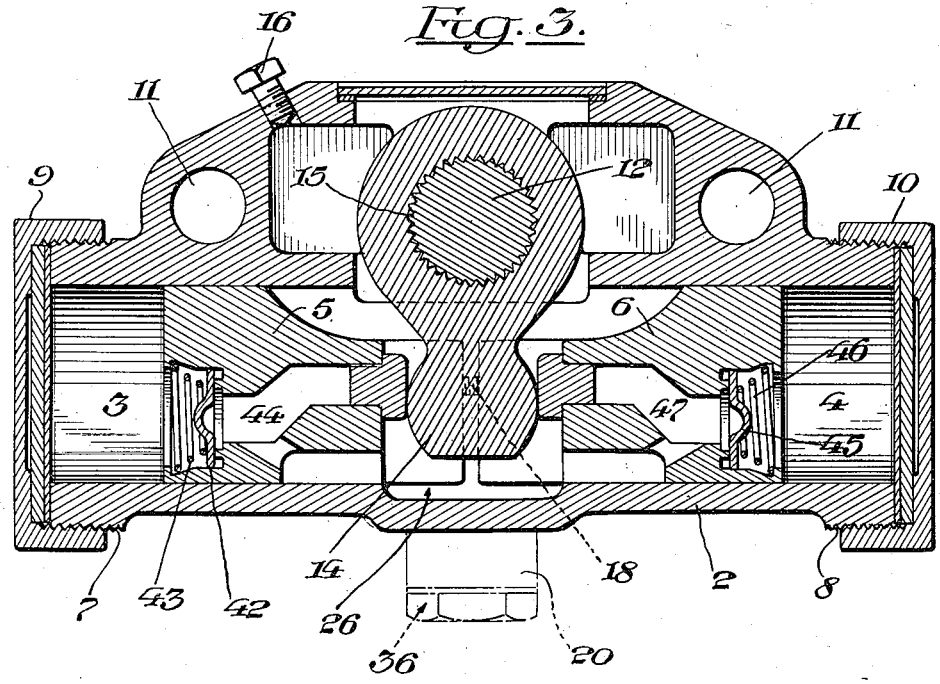
Fig. 3 is a vertical sectional view with the front half of Fig. 1 cut away to illustrate the interior of this improved shock absorber.

Before explaining in detail the present improvement and mode of operation thereof, I desire to have it understood that the invention is not limited to the details of construction and arrangement of parts which are illustrated in the accompanying drawings since the invention is capable of other embodiments, and that the phraseology which I employ is for the purpose of description and not of limitation.

The present improved shock absorber comprises a casing 2 having opposed cylindrical chambers 3 and 4 therein for the reception of pistons 5 and 6 hereinafter described. The ends of these cylinders are externally threaded as at 7 and 8 for the reception of caps 9 and 10 having therein lining washers of any suitable material to prevent leakage and effect a tight seal. This construction facilitates the machining of the necessary parts and renders the device readily accessible for any necessary repairs.

The instrument is designed for attachment to the frame of a motor vehicle by bolt openings 11, as indicated. Extending transversely of the upper portion of the casing and journaled therein is an oscillating shaft 12, adapted for attachment at its outer end 13 to the usual operating arm which in turn is connected with the axle of the vehicle through a link or similar instrumentality, not shown. The oscillating shaft is provided adjacent its inner end with a depending arm 14, which may be formed integral therewith if so desired, but which in the present instance is secured to the shaft by means of corresponding teeth or knurles 15. The depending arm 14 is engaged between co-operating or complementary pistons 5 and 6, disposed at opposite sides of the arm and sliding respectively in the cylindrical chambers 3 and 4 formed in the casing as hereinbefore described. The two piston members are rigidly connected by means of oppositely disposed bolts 18 and 19 extending through and threaded into the pistons 5 and 6 respectively and having their heads countersunk in the ends thereof. Thus it will be seen that the two pistons closely engage the arm 14 and are capable of being adjusted by means of the bolts 18 and 19 to take up any wear that may occur. With this construction detachable wear pieces may be used at the inner ends of the pistons if so desired.

Figure 4:
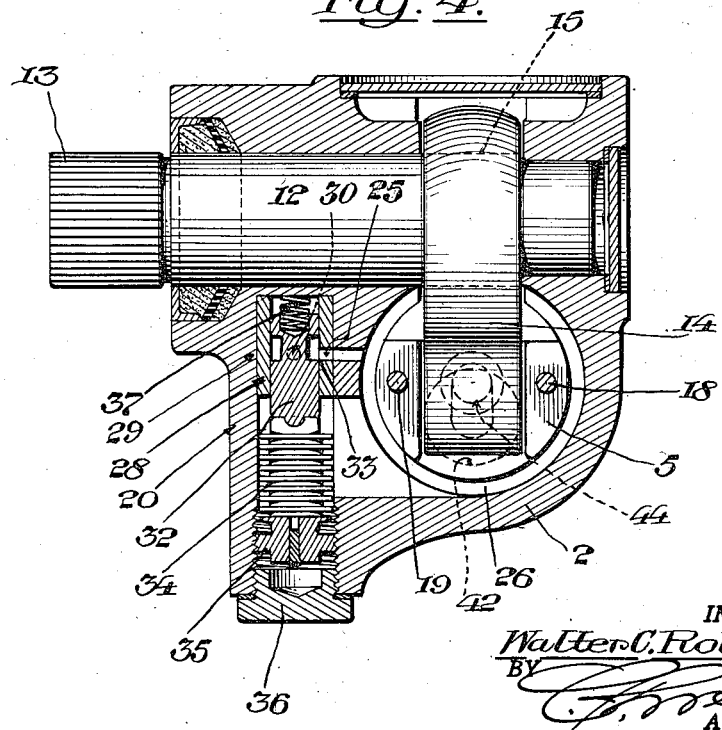
Fig. 4 is a vertical sectional view taken at right angles to Fig. 3; as on the line 4—4 of Fig. 1.

In this construction it will be obvious that movements of the operating arm in either direction due to spring flexure will cause a corresponding movement of the arm 14 and connected pistons within the cylinders. If these cylinders are maintained liquidly filled and escape of liquid is permitted only through the orifices hereinafter described, a resistance is in consequence created to movement in either direction. In order to provide for this resistance, as indicated more particularly in Fig. 2, the casing 2 is provided with tubular extensions 20 and 21, the extension 20 being somewhat larger than the extension 21 to accommodate a popoff type of valve generally indicated as 22 hereinafter more particularly described. Within these tubular extensions are passages 23 and 24 communicating freely at their outer ends with the ends of the cylinder chambers 3 and 4 respectively. These passages extend lengthwise of the casing to a point approximately central, and at this point communicate by means of a duct or passage 48 with passage 25 leading directly into the fluid replenishing chamber 26. Thus movement of the pistons in either direction forces liquid through the outlet passage and thence back to the fluid chamber, the direction of flow depending upon the direction of movement of the pistons. This flow is restricted and governed by providing a detachable sleeve 28, which fits into the casing at 29 and has port openings 25, 30 and 31 designed to accurately regulate the flow therethrough to provide a governed orifical flow. The flow through these port openings is controlled by a bellows-operated valve 32 slidingly supported within a sleeve and designed to cut off a portion of the orifice by its edge 33 as the valve moves inwardly in Fig. 4.

In order to cause regulation of the orificial flow to be governed in accordance with temperature changes, the valve 32 is connected directly with a bellows thermostat 34, which is filled with an expansible liquid and hermetically sealed, this liquid expanding and contracting with changes in temperature, and operating the valve in a like manner to restrict the orifical openings to a greater or less extent, depending upon temperature conditions. The valve and thermostat assembly are connected at their outer ends with a threaded plug 35, which may be adjusted to determine the initial setting of the assembly. After such setting the opening is closed by a cap nut 36. A spring 37 located beyond the bellows valve and tending to constantly force the bellows into contracted position, insures against any tendency for the bellows to remain in expanded position after the temperature has been reduced.

In the larger tubular extension 20 is located a "popoff type valve" which closes the passage 23 by means of a valve 22 resting on the valve seat 39, it being adjustably held in position by means of a spring 40 and nut 41. This valve 22 is located on the recoil side of the shock absorber. The valve 22 has a rearwardly extending portion capable of fitting within a correspondingly depending bore in the nut 41. The fit of these parts is such that the valve will freely slide back and forth under pressure without the passage of the liquid behind the valve into the depending bore of the nut 41. Thus it will be readily seen that the flow of fluid through the passage 23 is temporarily restricted or interrupted by the valve 22 until such time as the pressure of the fluid becomes greater than the resistance of the spring 40 when the valve is forced open and remains open until the pressure of the fluid is decreased by the withdrawal of the pressure thereon by the withdrawal of the piston 5 when the spring 40 again causes the valve 22 back against its seat 39.

This construction permits the fluid flow to be temporarily interrupted on the rebound of the shock absorber but it is to be noted that once the valve is forced open it remains open during the remainder of the stroke and the liquid flow is then controlled entirely by the thermostatically controlled restricted orifice valve.

From the foregoing it will be evident that fluid resistance to movement of the pistons 5 and 6 is created by restricting the flow of fluid from either fluid working chamber through the ported valve sleeve 28 which controls exhaust into the fluid replenishing chamber. By virtue of this construction, resistance is provided against vehicle spring flexure both on the movement of impact and on the movement of rebound. In the illustrated embodiment of the invention, resistance to movement of impact is less than that of rebound, and is afforded by metering liquid flow through the port 31 upon movement of the piston 6 to the right in Fig. 2. In like manner, resistance to spring rebound is afforded by the restriction of the poppet valve and the more restricted port 30, through which liquid is directed upon movement of the piston 5 to the left in Fig. 2. Replenishment of the working chambers 3 and 4 occurs upon the non-working or replenishment stroke of each piston, and is accomplished by drawing fluid directly from the fluid chamber 26 through the head of the piston in each case. This will be evident from an inspection of Fig. 2 of the drawings from which it may be observed that after the piston 5 has moved to the left, forcing liquid to the fluid chamber through the poppet valve and the restricted port 30, it is caused to return to the right in correspondence with movement of the piston 6 which is then on the working stroke. This return movement of the piston 5 creates a partial vacuum within the chamber 3, which lifts the replenishing valve 42 against the light spring 43, and permits the free inflow of fluid to the chamber 3 through the main port 44 within the piston communicating directly with the fluid chamber. The fluid chamber 4 is replenished in a similar manner through the piston 6 upon the return stroke of the latter by means of valve 45, spring 46 and main port 47. It will be noted that the pressure within the fluid replenishing chamber is substantially atmospheric, and that the difference in pressure serving for replenishment is caused by the partial vacuum which exists in each of the fluid chambers upon the return stroke of the piston. Replenishment of the fluid chamber when needed is accomplished through a filling plug 16 as indicated in Figs. 1 and 3.

It is not deemed necessary to describe in detail herein the construction of the bellows thermostatic control valve as this has been done in my said contemporaneously pending application.

It will be evident that with this construction a single control mechanism is provided for accurately and predictably controlling the resistance to spring flexure on both impact and rebound, but with a temporary interruption on the rebound and that because of the unitary control and the common temperature compensation applied to this control, compensation is accordingly applied to both types of resistance in predetermined ratio, thus avoiding any irregularities which would otherwise be unavoidable if employing a plurality of controls independently compensated. Furthermore, the passages 23 and 24 are of sufficiently ample size to insure that restriction shall occur by flow through the ports; thus by varying or altering the ported sleeve 28 the same instrument is equally well adapted to right or left operation. Furthermore, if desired, the sleeve can be altered or a new one substituted with ports of different size and shape to permit the employment of fluids of different viscosity or different characteristics. The adjustment of the resistance to produce either a hard or soft ride may be secured from without the instrument by a bodily adjustment of the bellows thermostat and connected valve in a lengthwise direction. Furthermore, the valve and thermostat may be readily removed for servicing if so desired. In as much as the pressure area is confined to the region of the passages 23 and 24 and the metering ports 30 and 31, the chamber within which the bellows thermostat is contained being substantially sealed by the plug valve, is not normally subject to unusual pressures tending to damage the thermostat or promote leakage of fluid through the sealing cap. As will be evident, the region of pressure which alternately shifts from end to end of the instrument in each case is confined to the working fluid chamber, the passages 23 and 24 communicating therewith and the metering orifice in active service at any given time.

The instrument is economical to manufacture, is simple and rugged in design, affords the necessary controllable resistance to both impact and rebound, has a minimum of surface area for undesirable leakage except through the restricting ports, is capable of predictable operation regardless of variations in fluid viscosity, may be readily and effectively adjusted to vary the ride, and is equally capable of servicing in the event of repair being needed.

It will be noted that temperature compensation is accomplished through the employment of a metallic bellows filled with an expansible liquid which causes the bellows to expand and contract and correspondingly move the plug valve with variation in temperature. This method of control has been found definitely superior to other methods, both because of its relatively constant or uniform movement within the range of temperatures usually met with in a shock absorber, and the power exerted by the bellows thermostat for adjusting the position of the valve in the event that the latter may stick or be subject to pressure considerations. An expansible rod of solid material would require such a length to impart the necessary increments of movement to the valve as to make it virtually impractical for the purpose. On the other hand, a bi-metallic type of thermostat in the shape of a spring or the like, although affording ample movement of distortion, nevertheless is totally lacking in power and could not be relied on to give a constant position of the metering or plug valve or its equivalent regardless of sticking or pressure conditions, nor could it be relied on to maintain the valve in any given position with pressure variations imposed thereon. With the liquidly filled bellows, on the other hand, the increment of movement depends upon the expansion of the liquid column, and the power created by this expansive column of liquid is irresistable and limited only by the capacity of the metallic bellows to refrain from rupture.

Figs. 5, 6 and 7 illustrate graphical curves made on a special testing machine designed to give a true graphical picture of the resistance set up in the shock absorber relative to the stroke. The most pertinent part of these curves is the upper section from the nose to the center. These curves were all taken at 100 to 200 revolutions per minute.

A test was first made with a liquid shock absorber using a poppet or popoff control valve to restrict the fluid flow and the result obtained is that shown and illustrated in Fig. 5. It will be noted that this curve shows no increase in resistance or "build up" as denoted by the letter X in the other figures. The letter X is intended to denote the height of the curve. This curve has a blunt nose which is a characteristic of this type of valve controlled shock absorber. This curve is of comparatively uniform height throughout its length which is entirely different from the curve shown in Fig. 6 which has a gradual taper from its nose to the center. It will be noted however that in Fig. 5 there is a line crossing the curve at the end marked nose which line gives the appearance of a taper similar to that shown in Fig. 6 but somewhat sharper. This line indicates what happens on the rebound action of the spring upon the shock absorber using this type of valve when the fluid in the shock absorber becomes hot and is illustrated only because it is a part of the characteristic of this type of shock absorber but is not the common curve as illustrated by the curve with the blunt nose.

Fig. 6 illustrates a curve obtained with a shock absorber using a fixed orifice type of valve to restrict the liquid flow. It will be noted that this curve shows considerable increase in resistance, or "build up"—at X and that the nose is tapered which is a characteristic of this type of valve controlled shock absorber. This resistance increases as the speed increases due to the heating of the liquid but may be held constant by the use of a thermostat controlled valve.

Having found that a combination of these characteristics would be desirable the present improved shock absorber was devised and tested in like manner and Fig. 7 illustrates a curve obtained with its use. In this device the restricted orifice valve contains the thermostat control and is the main control valve and the poppet valve only temporarily interrupts the flow of the liquid on the rebound side up to a pressure designated as Y. Thus an observation of the curve of Fig. 7 will clearly indicate that it is possible with this construction to hold the resistance Y constant regardless of temperature changes and at the same time be able to control the resistance or "build up" X.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A shock absorber comprising a casing having a cylinder, a piston in said cylinder forming a compression chamber therein and having a valve controlled passage therethrough, piston operating means, a passage leading from said compression chamber and having a transverse communication with the piston passage, thermostatically controlled means located between said transverse piston passage and the passage leading from said compression chamber for controlling the passage of fluid, and fluid control means for temporarily interrupting the flow of fluid through the passage leading from the compression chamber.

2. A shock absorber comprising a casing having a cylinder, a piston in said cylinder forming a compression chamber therein, a passage leading from said compression chamber, thermostatically controlled means located exteriorly of the cylinder for controlling the passage of fluid through said passage, and fluid control means for temporarily interrupting the flow of fluid through said passage.

3. A shock absorber comprising a casing having a cylinder, a piston in said cylinder forming a pair of compression chambers, one at each end of the cylinder, a piston operating means, said piston having a valve controlled passage therethrough and in communication with said compression chambers, a passage leading from each compression chamber and terminating in a transverse passage in communication with the passage through the piston, a thermostatically controlled means located at the junction of said last passages with said transverse passage for controlling the flow of fluid, and a fluid control means located in one of the said passages leading from the compression chambers for temporarily interrupting the passage of fluid therethrough.

4. A shock absorber comprising a casing having a cylinder, a reciprocating piston in said cylinder forming a compression chamber therein and having an impact and a rebound movement, piston operating means, a passage leading from said compression chamber, a thermostatically controlled means for controlling the passage of fluid through said passage, and a fluid control means for temporarily interrupting the passage of fluid through said passage during each rebound movement of the piston.

5. A shock absorber comprising a casing having a cylinder, a piston in said cylinder forming a pair of compression chambers, one at each end of the cylinder, said piston having a passage therethrough, a passage leading from each compression chamber, a passage in communication with said last passages and the piston passage, a thermostatically controlled means located in said last passages communicating with the piston passage for controlling the flow of fluid and a fluid control means also located in one of said passages leading from the compression chambers for temporarily interrupting the passage of fluid during each rebound movement of the piston.

6. A shock absorber comprising a casing having a fluid chamber and a piston cylinder, a piston in said cylinder, means for actuating the piston in accordance with spring movement of impact and rebound, means for venting fluid discharge from the chamber alternately upon working movement of the piston therein and comprising communicating passages, a main control valve for controlling said passages, and a valve for temporarily interrupting the flow of fluid through one of said passages and operative on spring movement of rebound before the main control valve and to remain open when once released, said valves located outside of said cylinder.

7. A shock absorber comprising a casing having a fluid chamber and a piston cylinder, a piston in said cylinder, means for actuating the piston in accordance with spring movement of impact and rebound, means for venting fluid discharge from the chamber alternately upon working movement of the piston therein and comprising communicating passages, a thermostatically operative main control valve for controlling said passages, and a valve for temporarily interrupting the flow of fluid through one of said passages and operative to remain open when once released, said valves located outside of said cylinder.

8. A shock absorber comprising a casing having a cylinder, a piston in said cylinder forming two compression chambers therein, a valve controlled passage through said piston connecting said two chambers, a piston operating member, a pair of passages connecting said chambers with a common transverse passage leading into the piston passage, a poppet valve in one of said pair of passages and a thermostatically controlled valve adjacent said pair of passages and the transverse passage for controlling the fluid flow.

9. A shock absorber comprising a casing having a cylinder and a fluid reservoir, a piston in said cylinder forming two compression chambers therein, a piston operating member, valve controlled means extending through the piston for connecting said compression chambers and said reservoir, a pair of passages exteriorly of said cylinder leading from the compression chambers and terminating in a transverse passage leading into said fluid reservoir, a main valve located adjacent said three passages and means for temporarily interrupting the fluid flow in one of said passages.

10. A shock absorber comprising a casing having a cylinder and a fluid reservoir, a piston in said cylinder forming two compression chambers therein, a piston operating member, valve controlled means extending through the piston for connecting said compression chambers and said reservoir, a pair of passages exteriorly of said cylinder leading from the compression chambers and terminating in a transverse passage leading into said fluid reservoir, a thermostatically operative main valve located adjacent to said three passages and means for temporarily interrupting the fluid flow in one of said passages.

11. A shock absorber comprising a casing having a cylinder and a fluid reservoir therein, a piston in said cylinder forming an impact and a rebound compression chamber, a piston operating member, valve controlled means extending through the piston for connecting said compression chambers and said reservoir, a pair of passages located exteriorly of said cylinder connecting said chambers with a common transverse passage terminating in said reservoir, means located adjacent to said three passages for metering liquid flow therethrough and means located in the passage leading from the rebound chamber for temporarily interrupting the flow therethrough.

12. A shock absorber comprising a casing having a cylinder and a fluid reservoir therein, a piston in said cylinder forming an impact and a rebound compression chamber, a piston operating member, valve controlled means extending through the piston for connecting said compression chambers and said reservoir, a pair of passages located exteriorly of said cylinder connecting said chambers with a common transverse passage terminating in said reservoir, thermostatically operated means located adjacent to said three passages for metering liquid flow therethrough and means located in the passage leading from the rebound chamber for temporarily interrupting the flow therethrough.

13. A shock absorber comprising a casing having a cylinder and a fluid reservoir, a piston in said cylinder forming a pair of compression chambers at opposite ends thereof, a piston operating member, valve controlled means within the cylinder for supplying fluid from the reservoir to the chambers, a main control valve located exteriorly of said cylinder for metering liquid from both of said chambers back to the reservoir and means located between one of said chambers and the main control valve for temporarily interrupting the fluid flow.

14. A shock absorber comprising a casing having a cylinder and a fluid reservoir, a piston therein forming a pair of compression chambers at opposite ends thereof, a piston operating member, valve controlled means within the cylinder for supplying fluid from the reservoir to the chambers, a thermostatically operative main control valve located exteriorly of said cylinder for metering liquid flow from both of said chambers back to the reservoir and means located between one of said chambers and the main control valve for temporarily interrupting the fluid flow.

15. A shock absorber comprising a casing having a cylinder and a fluid reservoir therein, a piston in said cylinder forming a compression chamber at each end thereof, actuating means for said piston, a passage connecting both compression chambers with the reservoir, a valve at the chamber ends of said passage, said valve operative to close the passage upon each compression stroke of the piston and to open to permit replenishment of liquid from the reservoir to the chamber upon the depression stroke of the piston, a main control valve located exteriorly of said cylinder for metering the fluid flow from both of said chambers back to the reservoir, and a poppet valve located between one of said chambers and the main control valve for temporarily interrupting the fluid and operative to remain open when once released.

16. A shock absorber comprising a casing having a cylinder and a fluid reservoir therein, a piston in said cylinder forming a compression chamber at each end thereof, actuating means for said piston, a passage connecting both compression chambers with the reservoir, a valve at the chamber ends of said passage, said valve operative to close the passage upon each compression stroke of the piston and to open to permit replenishment of liquid from the reservoir to the chambers upon each depression stroke of the piston, a thermostatically operative main control valve located exteriorly of said cylinder for metering the fluid flow from both of said chambers back to the reservoir, and a poppet valve located between one of said chambers and the main control valve for temporarily interrupting the fluid and operative to remain open when once released.

17. A shock absorber comprising a casing having a cylinder and a fluid reservoir therein, a piston in said cylinder forming an impact and a rebound compression chamber at opposite ends of said piston, piston operating means, a passage connecting said chambers and said reservoir, a valve at each end of said passage adjacent to the impact and rebound chambers operative to close the passage upon the compression stroke of the piston toward each chamber and open on the depression stroke from each chamber to permit replenishment of the fluid chambers from the reservoir, a passage connecting each of said chambers with a common transverse passage in communication with the reservoir, a main control valve located outside of the cylinder and adjacent to said last passages for controlling the flow of fluid and means located in the passage between the rebound chamber and the main control valve for temporarily interrupting the fluid flow.

18. A shock absorber comprising a casing having a cylinder and a fluid reservoir therein, a piston in said cylinder forming an impact and a rebound compression chamber at opposite ends of said piston, piston operating means, a passage connecting said chambers and said reservoir, a valve at each end of said passage adjacent to the impact and rebound chambers operative to close the passage upon the compression stroke of the piston toward each chamber and open on the depression stroke from each chamber to permit replenishment of the fluid chambers from the reservoir, a passage connecting each of said chambers with a common transverse passage in communication with the reservoir, a thermostatically operative main control valve located outside of the cylinder and adjacent to said last passages for controlling the flow of fluid and means located in the passage between the rebound chamber and the main control valve for temporarily interrupting the fluid flow.

19. A shock absorber comprising a casing having a cylinder and a fluid reservoir therein, a piston in said cylinder forming an impact and a rebound compression chamber at opposite ends of said piston, piston operating means, a passage connecting said chambers and said reservoir, a valve at each end of said passage adjacent to the impact and rebound chambers operative to close the passage upon the compression stroke of the piston toward each chamber and open on the depression stroke from each chamber to permit replenishment of the fluid chambers from the reservoir, a passage connecting each of said chambers with a common transverse passage in communication with the reservoir, a thermostatically operative main control valve located outside of the cylinder and adjacent to said last passages for controlling the flow of fluid and means located in the passage between the rebound chamber and the main control valve for temporarily interrupting the fluid flow, said last means comprising a spring controlled valve.

20. A shock absorber comprising a casing having a cylinder, a reciprocating piston within the cylinder, said casing having working chambers at the ends of the piston and a fluid reservoir at the side of the piston and communicating passages between all of said chambers and said piston having a passage therethrough in communication with all of said chambers, fluid control valves carried by the piston, a thermostatically controlled valve controlling communication between the working chambers and the reservoir and piston, and means located in one of said passages between one of the working chambers and said thermostatically controlled valve for temporarily interrupting the passage of fluid.

WALTER C. ROBBINS.